United States Patent [19]

Evans et al.

[11] Patent Number: 4,746,725

[45] Date of Patent: May 24, 1988

[54] CYCLIC POLYCARBONATE-POLYEPOXIDE REACTION PRODUCT AND METHOD FOR THEIR PREPARATION

[75] Inventors: Thomas L. Evans, Clifton Park, N.Y.; Niles R. Rosenquist, Evansville; Edgar E. Bostick, Mt. Vernon, both of Ind.

[73] Assignee: General Electric Company, Schenectady, N.Y.

[21] Appl. No.: 19,153

[22] Filed: Feb. 25, 1987

[51] Int. Cl.$^4$ .............................................. C08G 63/62
[52] U.S. Cl. .................................... 528/370; 528/10; 528/25; 528/27; 528/95; 528/106; 528/107; 528/116; 528/361; 528/371
[58] Field of Search ................. 528/370, 116, 361, 10, 528/25, 27, 95, 371, 106, 107

[56] References Cited

FOREIGN PATENT DOCUMENTS 3311517 10/1984 Fed. Rep. of Germany .
7202318 12/1982 Japan .

Primary Examiner—Harold D. Anderson
Attorney, Agent, or Firm—William H. Pittman; James C. Davis, Jr.; James Magee, Jr.

[57] ABSTRACT

Resinous compositions are prepared by the reaction of a composition comprising cyclic polycarbonate oligomers with at least one polyepoxide compound, in the presence of a polycarbonate formation catalyst. The cyclic polycarbonate oligomer composition is preferably a mixture of oligomers of varying degrees of polymerization, and the polyepoxy compound is preferably triglycidyl isocyanurate or a bis-epoxy-terminated bisphenol A-epichlorohydrin concentrate. There may also be present a polycarbonate crosslinking agent. The product of the reaction is a crosslinked polycarbonate network. The method is particularly useful in reactive processing operations such as reaction injection molding.

16 Claims, No Drawings

CYCLIC POLYCARBONATE-POLYEPOXIDE REACTION PRODUCT AND METHOD FOR THEIR PREPARATION

This invention relates to resinous compositions and their preparation, and more particularly to the preparation of thermoset compositions from cyclic polycarbonate oligomers and polyepoxides.

Thermoset compositions prepared from linear polycarbonates and epoxy polymers have been described. For example, U.S. Pat. No. 3,098,056 describes the reaction of epoxy resins with linear polycarbonates and hardeners, and U.S. Pat. No. 3,261,808 describes the preparation and curing of polycarbonates containing epoxy end groups. The products are disclosed as being useful for the preparation of molded and cast articles, in laminates and as lacquers, binding agents and adhesives. For various reasons including the high melt viscosities of the polycarbonates, however, these methods are not suitable for use under reactive processing conditions such as reaction injection molding (RIM).

Recently, cyclic polycarbonate compositions with high versatility have been developed. Numerous disclosures of such compositions systems containing them and uses therefor have been disclosed in various patent publications and copending applications filed on behalf of the assignee of this application. For example, cyclic polycarbonate oligomer mixtures and methods for their preparation and polymerization to linear polycarbonates are disclosed in European patent application No. 162,379 and applications Ser. No. 704,122, filed Feb. 22, 1985 (now U.S. Pat. No. 4,644,053) and Ser. No. 888,673, filed July 24, 1986; the preparation of fiber-reinforced composites from such cyclic compositions are also disclosed in said application Ser. No. 888,673; the preparation of numerous copolymers from such cyclic compositions are disclosed in Ser. No. 907,557, filed Sept. 15, 1986; the use of bis(cyclic carbonates) as crosslinking agents for cyclic compositions in Ser. No. 744,074, filed June 12, 1985, now U.S. Pat. No. 4,636,559; and specific catalysts useful to convert the cyclic oligomer compositions into linear polycarbonates in U.S. Pat. No. 4,605,731 and application Ser. No. 941,901 filed Dec. 15, 1986, now U.S. Pat. No. 4,701,519. In very few if any of these disclosures, however, is a method suggested for converting cyclic polycarbonate oligomer compositions to thermoset materials.

The present invention provides such a method, which is capable of utilization under diverse conditions for the manufacture of a wide variety of articles and substances. Among the environments in which such compositions may be prepared and used are conventional two-component RIM systems. Also provided are compositions comprising crosslinked, thermoset networks prepared by said method.

Accordingly, one aspect of the present invention is a method for preparing a resinous composition which comprises reacting at an elevated temperature, in the presence of a polycarbonate formation catalyst, a composition comprising cyclic polycarbonate oligomers with at least one polyepoxy compound.

Cyclic polycarbonate oligomer compositions useful in the present invention are disclosed, for example, in the following U.S. Pat. Nos.: 3,155,683; 3,274,214; 3,386,954; 3,422,119. The preferred compositions are oligomer mixtures of the type disclosed in the aforementioned European Application No. 162,379 and application Ser. No. 704,122, the disclosures of which are incorporated by reference herein.

Such oligomers generally comprise structural units having the formula

wherein at least about 60% of the total number of $R^1$ values are aromatic organic radicals and the balance thereof are aliphatic, alicyclic or aromatic organic radicals. The aliphatic or alicyclic $R^1$ values generally contain up to about 8 carbon atoms. The $R^1$ values may contain substituents such as halo, nitro, alkoxy, lactone and the like. Most often, however, all $R^1$ radicals are hydrocarbon radicals.

Preferably at least about 80% of the total number of $R^1$ values in the cyclic oligomer mixtures, and most desirably all of said $R^1$ values, are aromatic. The aromatic $R^1$ radicals preferably have the formula

wherein each of $A^1$ and $A^2$ is a monocyclic divalent aromatic radical and $Y^1$ is a bridging radical in which one or two carbon atoms separate $A^1$ from $A^2$. The free valence bonds in formula II are usually in the meta or para positions of $A^1$ and $A^2$ in relation to $Y^1$.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^1$, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^1$ values may be considered as being derived from dihydroxy compounds of the formula

especially dihydroxyaromatic compounds and preferably bisphenols of the formula $HO-A^1-Y^1-A^2-OH$. The following dihydroxy compounds are illustrative:
Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol 1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2 2-Bis(3-n-propyl-4-hydroxyphenyl)propane
2,2-Bis(3-isopropyl-4-hydroxyphenyl)propane
2,2-Bis(3-t-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic oligomers have degrees of polymerization from 2 to about 30. Cyclic oligomer mixtures in which the molecular species have varying degrees of polymerization up to about 20, with a major proportion being up to about 12 and a still larger proportion up to about 15, are especially preferred. Such mixtures have relatively low melting points as compared to single compounds such as the corresponding cyclic trimer. The cyclic oligomer mixtures are generally liquid at temperatures above 300° C., most often at temperatures above 225° C. and frequently above 200° C.

The cyclic oligomer mixtures contain very low proportions (if any) of linear oligomers. In general, no more than about 10% by weight, and most often no more than about 5%, of such linear oligomers are present. The mixtures also usually contain low percentages, if any (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

Suitable cyclic oligomer mixtures may be prepared by a condensation reaction involving at least one bishaloformate having the formula

or a mixture thereof with at least one dihydroxy compound having formula III, wherein $R^1$ is as defined hereinabove and X is chlorine or bromine. (The compound of formula IV or mixture thereof with that of formula III is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula IV and, optionally, formula III, the bishaloformate composition may also contain other compounds, including oligomers of the formula

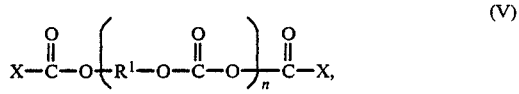

wherein $R^1$ and X are as previously defined and n is a small number, typically about 1–4.

While the X values in formula IV may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable dihydroxy compounds of formula III include those having divalent radicals of formula I which are different from the corresponding divalent radicals in the compound of formula IV. When such dihydroxy compounds are present, they generally comprise up to about 50%, most often up to about 20% and preferably up to about 10%, of the bischloroformate mixture. Most preferably, however, said mixture consists essentially of bischloroformates.

The tertiary amines useful in the oligomer formation reaction ("tertiary" in this context denoting the absence of N—H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6–14 carbon atoms.

The most useful amines are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the oligomer formation reaction is an aqueous alkali metal hydroxide solution. It is most often lithium, sodium or potassium hydroxide, with sodium hydroxide being preferred because of its availability and relatively low cost. The concentration of said solution is about 0.2–10 M and preferably no higher than about 3 M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in the first step the reagents and components are placed in contact under conditions wherein the bischloroformate composition is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scope of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003–0.6 mole thereof is used when it consists entirely of bischloroformate, and no more than about 0.5 mole is used when it is a mixture of compounds of formulas III and IV. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1–1.0:1 and most often about 0.2–0.6:1. The preferred molar ratio of alkali metal hydroxide to said composition is about 1.5–3:1 and most often about 2–3:1.

In a second step, the oligomer mixture may be separated from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0°–50° C.; the amount of bischloroformate composition used being up to about 0.7 mole for each liter of said organic liquid present in the reaction system, and the molar proportions of amine and alkali metal hydroxide to bischloroformate composition being approximately 0.2–1.0:1 and 2–3:1, respectively; and recovering the cyclic oligomers thus formed.

As in the embodiment previously described, another portion of said liquid may serve as a solvent for the bischloroformate composition. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLE 1

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9 M aqueous sodium hydroxide, 1.16 ml. of triethylamine and 5 ml. of 0.66 M aqueous disodium salt of bisphenol A. The mixture was heated under reflux, with stirring, as 40 ml. of a 1.06 M solution of the bischloroformate in methylene chloride was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

EXAMPLE 2

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5 M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene-1,4-dimethanol.

EXAMPLES 3–12

Following the procedure of Example 2, products containing at least about 80% mixed cyclic polycarbonate oligomers were prepared from mixtures of bisphenol A bischloroformate and the dihydroxy compounds listed in Table I. In each case, a total of 2 mmol. of bischloroformate composition was used. The proportion of the listed dihydroxy compound therein was 10 mole percent unless otherwise indicated.

TABLE I

| Example | Dihydroxy compound |
|---|---|
| 3 | 1,1-Bis(4-hydroxyphenyl)cyclohexane |
| 4 | 1,1-Bis(4-hydroxyphenyl)cyclododecane |
| 5 | 2,2-Bis(3,5-dimethyl-4-hydroxyphenyl)propane |
| 6 | 2,2-Bis(3,5-dibromo-4-hydroxyphenyl)propane |
| 7 | 2,2-Bis(4-hydroxyphenyl)-1,1-dichloroethylene |
| 8 | Hydroquinone |
| 9 | Hydroquinone (15 mole percent) |
| 10 | Bis(4-hydroxyphenyl) sulfide |
| 11 | Bis(4-hydroxyphenyl) sulfone |
| 12 | Bis(3,5-dimethyl-4-hydroxyphenyl) sulfone |

Many types of polyepoxy compounds are known in the art, and any of them are suitable for use in the present invention. The following are illustrative.

(1) Diglycidyl ethers of bisphenols such as those listed hereinabove, especially bisphenol A, and corresponding oligomers and other polymers. These include compounds of the formula

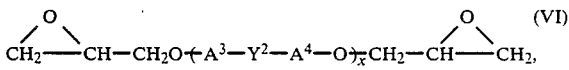

$$CH_2\underset{\diagdown O\diagup}{-}CH-CH_2O(A^3-Y^2-A^4-O)_xCH_2-CH\underset{\diagdown O\diagup}{-}CH_2, \quad (VI)$$

wherein each of $A^3$ and $A^4$ is a monocyclic divalent aromatic radical as previously defined for $A^1$ and $A^2$, $Y^2$ is a bridging radical as previously defined for $Y^1$ and $x$ is at least 1.

(2) Epoxy novolaks of the formula

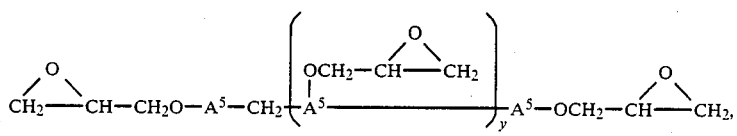

(VII)

wherein each $A^5$ is an aromatic radical and y has an average value of at least about 0.1.

(3) Glycidyl adducts of amines and amides, illustrated by N,N-diglycidylaniline, N,N,N′,N′-tetraglycidylxylylenediamine and triglycidyl isocyanurate.

(4) Glycidyl esters of carboxylic acids, such as diglycidyl phthalate and diglycidyl adipate.

(5) Polymers of unsaturated epoxides such as glycidyl acrylate, glycidyl methacrylate and allyl glycidyl ether.

(6) Polysiloxanes containing epoxy functionality, such as the diglycidyl ether of 1,3-bis(3-hydroxypropyl)tetramethyldisiloxane.

(7) Compounds prepared by epoxidation of dienes or polyenes, such as bis(2,3-epoxycyclopentyl) ether and vinylcyclohexene dioxide.

For many purposes, it is preferred to employ triglycidyl isocyanurate or a bis-epoxy-terminated bisphenol A-epichlorohydrin condensate. Triglycidyl isocyanurate is particularly useful at reaction temperatures up to about 275° C.

The polycarbonate formation catalysts which can be used include various bases and Lewis acids. The bases are preferred in the present invention.

It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomers. Examples thereof are lithium phenoxide, lithium 2,2,2-trifluoroethoxide, n-butyllithium and tetramethylammonium hydroxide. Also useful are various weakly basic salts such as sodium benzoate and lithium stearate.

A class of Lewis bases which is particularly useful under many conditions has previously been identified as being disclosed in U.S. Pat. No. 4,605,731. It comprises numerous tetraarylborate salts, including lithium tetraphenylborate, sodium tetraphenylborate, sodium bis(2,2′-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Another class of particularly useful basic catalysts is disclosed in the aforementioned application Ser. No. 941,901, the disclosure of which is also incorporated by reference herein. It comprises polymers containing alkali metal phenoxide and especially lithium phenoxide moieties. They are usually present as end groups, especially on linear polycarbonates having a number average molecular weight in the range of about 8,000-20,000 as determined by gel permeation chromatography relative to polystyrene. Such catalysts may be produced by reacting a suitable polymer with an alkali metal base, typically at a temperature in the range of about 200°-300° C.

For most purposes, the preferred catalysts according to this invention are lithium phenoxide-terminated polycarbonates and tetramethylammonium tetraphenylborate.

The Lewis acids which may be used as polycarbonate formation catalysts are selected from non-halide compounds and include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the trade name "Tyzor AA") and the bisisopropoxyaluminum salt of ethyl acetoacetate.

It is also within the scope of the invention to incorporate in the cyclics-polyepoxide reaction mixture a polycarbonate crosslinking agent. Illustrative crosslinking agents of this type are polyfunctional phenols and polyfunctional organic carbonates, including the bis(cyclic carbonates) disclosed in U.S. Pat. No. 4,604,434 and the aforementioned copending application Ser. No. 744,074, the disclosures of which are incorporated by reference herein. Said bis(cyclic carbonates) have the formula

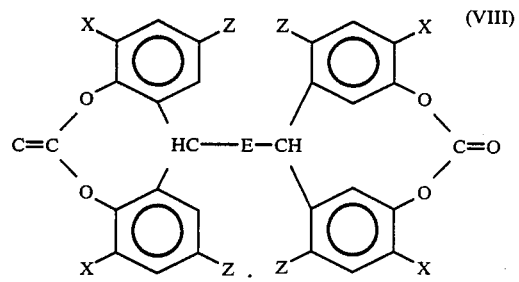

(VIII)

wherein E is an alkylene radical containing from 2 to about 12 carbon atoms, each X is independently hydrogen or lower alkyl and each Z is independently lower alkyl. The E value is most often a normal alkylene radical having 2-6 carbon atoms and especially trimethylene, each X is hydrogen or methyl and each Z is methyl.

The method of this invention is effected by heating the mixture of the above-described reactants at an elevated temperature, typically in the range of about 225°-300° C., for a period of time effective to complete said reaction. It appears that the reaction mechanism involves an initial reaction between the cyclic polycarbonate oligomer composition and the polycarbonate formation catalyst to form a "living" anionic polycarbonate which then initiates ring-opening of the polyepoxide and reacts therewith to form a crosslinked, thermoset material. This mechanism is confirmed by the fact that certain polycarbonate formation catalysts, specifically the tetraphenylborates, are themselves ineffective to ring-open said polyepoxides.

The proportion of cyclic polycarbonate oligomer composition to polyepoxide is not critical and may be widely varied, depending on the properties desired in the reaction product. In general, the ratio of carbonate groups in the oligomer composition (including any crosslinking agent) to equivalents of polyepoxide is in the range of about 0.5–50:1 and preferably about 2–30:1. (The equivalent weight of a polyepoxide, for the purposes of this invention, is its molecular weight divided by the number of epoxy groups therein.)

The proportion of polycarbonate formation catalyst is most often about 0.001–1.0 mole percent and preferably about 0.005–0.1 mole percent, based on carbonate units. When a crosslinking agent is present, about 0.001–10 mole percent thereof is used, based on carbonate units in the oligomer composition.

Another aspect of the invention is compositions prepared by the above-described method. Said compositions are useful in the same manner as previously disclosed epoxy-reacted polycarbonates. In particular, they may be used for the preparation of molded and cast articles, in laminates and as lacquers, binding agents and adhesives.

Inert fillers, particularly fibrous fillers such as glass fibers, may be incorporated in the cyclics-polyepoxide reaction mixture, whereupon filled and/or reinforced compositions are obtained. Such compositions are another aspect of the invention.

Still another aspect of the invention is useful in reactive processing operations such as RIM. In such operations, two liquid streams are fed into a mold where they react to form a resinous article. By reason of the non-reactivity of polycarbonate formation catalysts with polyepoxides, the present invention includes a method of preparing a molded thermoset article which comprises charging a heated mold with two liquid streams, one comprising a polyepoxy compound and a polycarbonate formation catalyst and the other comprising a cyclic polycarbonate oligomer composition and, optionally, a polycarbonate crosslinking agent as previously described. Reaction takes place in the mold to form the desired article, which is a still further aspect of the invention.

The invention is illustrated by the following examples. All parts are by weight. Intrinsic viscosities were determined in methylene chloride at 25° C.

EXAMPLES 13–14

Two 2.56-gram samples (10 mmol. based on carbonate units) of a cyclic bisphenol A polycarbonate oligomer mixture similar to that of Example 1 were weighed into dry test tubes and dried for 3 hours under vacuum. There was then added 2.9 mg. of lithium stearate and drying was continued for ½ hour. Measured amounts of a commercially available bisphenol A diglycidyl ether were then added and the mixtures were melted and thoroughly stirred. The tubes were purged with nitrogen and heated for 1 hour at 250° C., with thorough stirring after 20 and 55 minutes.

The products were exhaustively extracted with methylene chloride and the intrinsic viscosities and percentages of methylene chloride-insoluble gel were determined for the extracts. Comparison was made with a control prepared similarly with the omission of epoxide. The insoluble products were crosslinked, thermoset resins which were insoluble in most organic solvents. Relevant compositional details and properties are given in Table I.

TABLE I

| Example | Ratio, moles carbonate/equivs. polyepoxide | IV of soluble fraction, dl./g. | % gel in insoluble fraction |
|---------|---------|---------|---------|
| Control | — | 0.660 | 6.4 |
| 13 | 25:1 | 0.615 | 16.9 |
| 14 | 10:1 | 0.594 | 32.2 |

EXAMPLE 15

A mixture of 1 gram (3.94 mmol. based on carbonate units) of a bisphenol A cyclic polycarbonate oligomer mixture similar to that of Example 1, 1 gram (0.7 meq.) of a bisphenol A-epichlorohydrin condensate having a degree of polymerization of about 9 and two epoxy end groups, and 0.77 mg. (0.002 mmol.) of tetramethylammonium tetraphenylborate was dissolved in methylene chloride and the solvent was removed by evaporation in vacuum. The sample was heated for 2½ hours at 250° C. and completely solidified within ½ hour. The product was insoluble in methylene chloride and had a glass transition temperature of about 88° C.

EXAMPLE 16

The procedure of Example 15 was repeated, except that the reaction mixture also contained 120 mg. (0.115 mmol.) of a bis(cyclic carbonate) having the formula

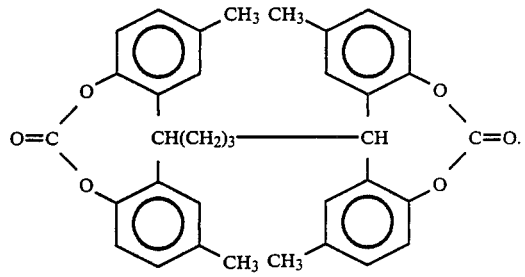

The product was insoluble in methylene chloride and chloroform.

EXAMPLES 17–18

A mixture of 50 parts of a bisphenol A polycarbonate having a number average molecular weight of about 15,600 and 0.2 part of lithium phenoxide was heated under nitrogen for 30 minutes in a Helicone vertical mixer. There was then obtained a polycarbonate formation catalyst comprising a lithium phenoxide-terminated polycarbonate having a number average molecular weight of about 10,700.

Mixtures of 1 part of a cyclic bisphenol A polycarbonate oligomer mixture similar to that of Example 1, 0.2 and 0.5 parts, respectively, of an epoxidized cresol novolak commercially available under the name "Quatrex Crosslinker TE-149", and 0.1 mole percent (based on carbonate units) of the lithium phenoxide-terminated polycarbonate catalyst were 5 heated at 250° C. until polymerization was complete. The products were substantially insoluble in organic solvents.

EXAMPLE 19

Mixtures of a cyclic bisphenol A polycarbonate oligomer mixture similar to that of Example 1, triglycidyl cyanurate (TGIC) or bisphenol A diglycidyl ether (BGE) as polyepoxy compounds, and 0.1 mole percent of the catalyst of Examples 17-18 were dissolved in methylene chloride and the solvent was removed by evaporation. The mixture were further dried at 110° C. for 2 hours under nitrogen in a vacuum oven. Samples of the mixtures were heated at 250° or 300° C. for various periods of time, under nitrogen. They were then recovered by breaking the test tubes and extracted with methylene chloride. The percentages of insoluble gel formed under various conditions ar listed in Table II.

TABLE II

| Polyepoxide | | Reaction time, min. | Temperature, °C. | Catalyst conc., mole % | % gel |
|---|---|---|---|---|---|
| Identity | Conc., mole % | | | | |
| BGE | 10 | 5 | 250 | 0.25 | 23 |
| " | " | " | 300 | " | 91 |
| " | " | 10 | 250 | " | 58 |
| " | " | " | 300 | " | 90 |
| " | " | 15 | 250 | " | 84 |
| " | " | " | 300 | " | 85 |
| " | " | " | 250 | 0.10 | 69 |
| " | " | " | 300 | " | 87 |
| " | 5 | " | 250 | " | 38 |
| " | " | " | 300 | " | 91 |
| " | 10 | 30 | 250 | 0.25 | 92 |
| " | " | " | 300 | " | 80 |
| TGIC | 10 | 10 | 250 | 0.10 | 90 |
| " | " | 15 | 250 | " | 96 |
| " | " | " | 300 | " | 79 |
| " | 5 | " | 250 | " | 94 |
| " | " | " | 300 | " | 79 |
| " | 10 | 30 | 300 | " | 81 |

What is claimed is:

1. A method for preparing a resinous composition which comprises reacting at an elevated temperature, in the presence of a polycarbonate formation catalyst, a composition comprising cyclic polycarbonate oligomers with at least one polyepoxy compound.

2. A method according to claim 1 wherein the cyclic polycarbonate oligomer composition is a mixture of oligomers of varying degrees of polymerization comprising structural units having the formula

wherein at least about 60% of the total number of $R^1$ values are aromatic organic radicals and the balance thereof are aliphatic, alicyclic or aromatic organic radicals, the polyepoxide is a bis-epoxy-terminated bisphenol A-epichlorohydrin concentrate or triglycidyl isocyanurate and the reaction is conducted at a temperature in the range of about 225°-300° C.

3. A method according to claim 2 wherein each $R^1$ value has the formula

wherein each of $A^1$ and $A^2$ is a monocyclic divalent aromatic radical and $Y^1$ is a bridging radical in which one or two carbon atoms separate $A^1$ from $A^2$, the polycarbonate formation catalyst is a lithium phenoxide-terminated polycarbonate or tetramethylammonium tetraphenylborate, and the ratio of carbonate groups in the oligomer composition to equivalents of polyepoxide is in the range of about 0.5-50:1 and the proportion of polycarbonate formation catalyst is about 0.005-0.1 mole percent based on carbonate units.

4. A method according to claim 3 wherein each of $A^1$ and $A^2$ is p-phenylene and $Y^1$ is isopropylidene.

5. A method according to claim 3 wherein the polyepoxide is a bis-epoxy-terminated bisphenol A-epichlorohydrin concentrate.

6. A method according to claim 3 wherein the polyepoxide is triglycidyl isocyanurate.

7. A method according to claim 3 wherein there is also present a polycarbonate crosslinking agent in the amount of about 0.001-10 mole percent based on carbonate units in the oligomer composition.

8. A method according to claim 7 wherein the crosslinking agent is a polyfunctional phenol or a polyfunctional organic carbonate.

9. A method of preparing a molded thermoset article which comprises charging a heated mold with two liquid streams, one comprising a polyepoxy compound and a polycarbonate formation catalyst and the other comprising a cyclic polycarbonate oligomer composition, whereby reaction takes place to form said article.

10. A method according to claim 9 wherein the cyclic polycarbonate oligomer composition is a mixture of oligomers of varying degrees of polymerization comprising structural units having the formula

wherein at least about 60% of the total number of $R^1$ values are aromatic organic radicals and the balance thereof are aliphatic, alicyclic or aromatic organic radicals, the polycarbonate formation catalyst is a basic catalyst, the polyepoxide is a bis-epoxy-terminated bisphenol A-epichlorohydrin concentrate or triglycidyl isocyanurate and the reaction is conducted at a temperature in the range of about 225°-300° C.

11. A method according to claim 10 wherein each $R^1$ value has the formula

wherein each of $A^1$ and $A^2$ is a monocyclic divalent aromatic radical and $Y^1$ is a bridging radical in which one or two carbon atoms separate $A^1$ from $A^2$, the polycarbonate formation catalyst is a lithium phenoxide-terminated polycarbonate or tetramethylammonium tetraphenylborate, and the ratio of carbonate groups in the oligomer composition to equivalents of polyepoxide is in the range of about 0.5-50:1 and the proportion of polycarbonate formation catalyst is about 0.005-0.1 mole percent based on carbonate units.

12. A method according to claim 11 wherein each of $A^1$ and $A^2$ is p-phenylene and $Y^1$ is isopropylidene.

13. A method according to claim 11 wherein the polyepoxide is a bis-epoxy-terminated bisphenol A-epichlorohydrin concentrate.

14. A method according to claim 11 wherein the polyepoxide is triglycidyl isocyanurate.

15. A method according to claim 11 wherein there is also present a polycarbonate crosslinking agent in the amount of about 0.001-10 mole percent based on carbonate units in the oligomer composition.

16. A method according to claim 15 wherein the crosslinking agent is a polyfunctional phenol or a polyfunctional organic carbonate.

* * * * *